No. 765,943. Patented July 26, 1904.

UNITED STATES PATENT OFFICE.

KARL FR. TÖLLNER, OF BREMEN, GERMANY.

PROCESS OF MAKING A SUBSTITUTE FOR COD-LIVER OIL.

SPECIFICATION forming part of Letters Patent No. 765,943, dated July 26, 1904.

Application filed November 25, 1903. Serial No. 182,646. (No specimens.)

*To all whom it may concern:*

Be it known that I, KARL FRIEDRICH TÖLLNER, a citizen of the Free State of Bremen, residing at Humboldtstrasse 44, in the city of Bremen, German Empire, have invented a new and Improved Process of Manufacturing a Substitute for Cod-Liver Oil, of which the following is a specification.

The curative properties of cod-liver oil are due, as is known, to its emulsiveness, as well as to its content of natural iodid, although the precise form in which iodin is present is still unknown. It is impossible to produce a preparation of the same sanative qualities by dissolving pure iodid in a fatty oil or oils.

The object of my invention is to produce an equivalent substitute for the oil in question, and I obtain that object by the process hereinafter described.

The raw material which I employ consists of certain kinds of marine algaceous plants— *i. e.*, seaweed and the like—particularly such as *Laminaria digitata*, *Laminaria saccharina*, *Fucus serratus*, *Fucus vesiculosus*, and the like. Care should be taken, however, that these plants are gathered at the places where they grow, because the so-called "sea-wrack" found swimming in the open sea contains by far less iodid and other active or efficacious substances. The plants are dried, cut into pieces, and roasted in iron drums until the pieces can be easily comminuted or pulverized between the fingers. The roasted pieces are then finely pulverized and the pulverulent particles are instantly thereafter mixed with a suitable fatty oil or oils, preferably, sesame-oil and arachis-oil or their equivalents. The vegetable particles being thus extracted by oil or mixture of oils, the dissoluble substances of said particles, in so far they are soluble in oil, are dissolved by and in the same, particularly a certain empyreumatic oil containing very much acid. After about a week, in which the mixture has been repeatedly shaken, the liquid parts of the mixture are separated from the solid ones, the residue is squeezed out, and the turbid oil thus obtained is filtered, when it is ready for use.

Where the structure of the plants is rather compact, it is advantageous to first mix the roasted vegetable parts with alcohol, preferably with a quantity of the same weight as said parts, and to add the oil only after some days. The alcohol may afterward be removed from the oil by slightly heating the same. As to the proportions, I generally take one part, in weight, of algaceous plants and nine parts, in weight, of oil; but this proportion may be changed, according to the direction of the physician.

Having now described my invention, what I desire to secure by Letters Patent is—

1. The process of manufacturing a substitute for cod-liver oil, which consists in extracting roasted algaceous plants by means of a fatty oil, substantially as described.

2. The process of manufacturing a substitute for cod-liver oil, which consists in extracting roasted marine algaceous plants by means of a fatty oil, and separating thereafter the oil from the solid parts, substantially as described.

3. The process of manufacturing a substitute for cod-liver oil, which consists in drying and roasting marine algaceous plants, extracting the dry parts by a fatty oil, shaking the mixture of the vegetable parts and the oil during the extraction, and separating the oil from the said parts, substantially as described.

4. The process of manufacturing a substitute for cod-liver oil, which consists in drying marine algaceous plants, cutting the dried parts into pieces, roasting them, pulverizing the roasted pieces, mixing the pulverulent vegetable parts with a fatty oil and letting them extract by the same, separating the oil from said parts, and filtering it, substantially as described.

In witness whereof I have hereunto set my hand in presence of two witnesses.

KARL FR. TÖLLNER.

Witnesses:
FR. HOGERMANN,
C. DIEDERICH.